United States Patent [19]

Claudio

[11] Patent Number: 5,069,467
[45] Date of Patent: Dec. 3, 1991

[54] FRONT SHOCK ABSORBING UNIT FOR MOTORCYCLES

[76] Inventor: De Bei, Claudio, Via Bonamigo, 7, 36061 Bassano Del Grappa, Italy

[21] Appl. No.: 526,510

[22] Filed: May 21, 1990

[30] Foreign Application Priority Data

May 24, 1989 [IT] Italy .................................. 8559 A/89

[51] Int. Cl.⁵ .......................................... B62K 21/02
[52] U.S. Cl. .................................... 280/276; 280/279
[58] Field of Search ............... 280/275, 276, 277, 279; 180/219

[56] References Cited

U.S. PATENT DOCUMENTS

| | | | |
|---|---|---|---|
| 4,388,978 | 6/1983 | Fior | 180/219 |
| 4,526,249 | 7/1985 | Parker | 180/219 |
| 4,756,547 | 7/1988 | Trema | 280/276 |
| 4,785,905 | 11/1988 | Trema . | |

FOREIGN PATENT DOCUMENTS

| | | | |
|---|---|---|---|
| 2533523 | 9/1983 | France . | |
| 2539375 | 7/1984 | France | 280/276 |
| 2589421 | 10/1986 | France . | |
| 452156 | 4/1949 | Italy | 280/276 |
| 2121364 | 12/1983 | United Kingdom . | |
| 2131754 | 6/1984 | United Kingdom . | |

*Primary Examiner*—Richard A. Bertsch
*Assistant Examiner*—Paul Dickson
*Attorney, Agent, or Firm*—Fay, Sharpe, Beall, Fagan, Minnich & McKee

[57] ABSTRACT

The present invention pertains to a front shock absorbing unit for motorcycles, whose main characteristic is that the shock absorbing element (22), pivoted to the frame (23), is located in such a way as to correspond to the longitudinal plane of symmetry of the frame, and is connected by means of a pin (20) to an articulated structure (5, 6, 11, 13, 16, 18) which includes in particular two forks (5 and 6) pivoted to the stanchions (1) which in turn are pivoted to the hub (2) of front wheel (3) (FIG. 1).

8 Claims, 5 Drawing Sheets

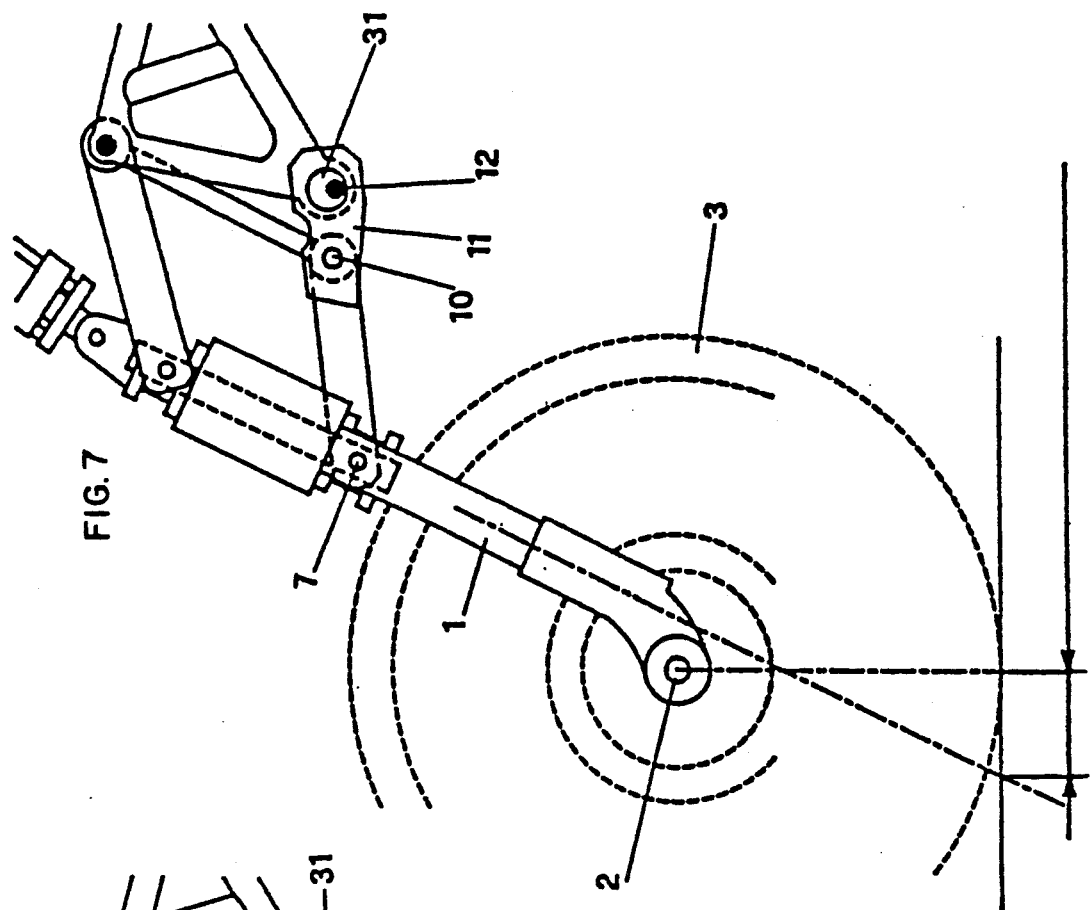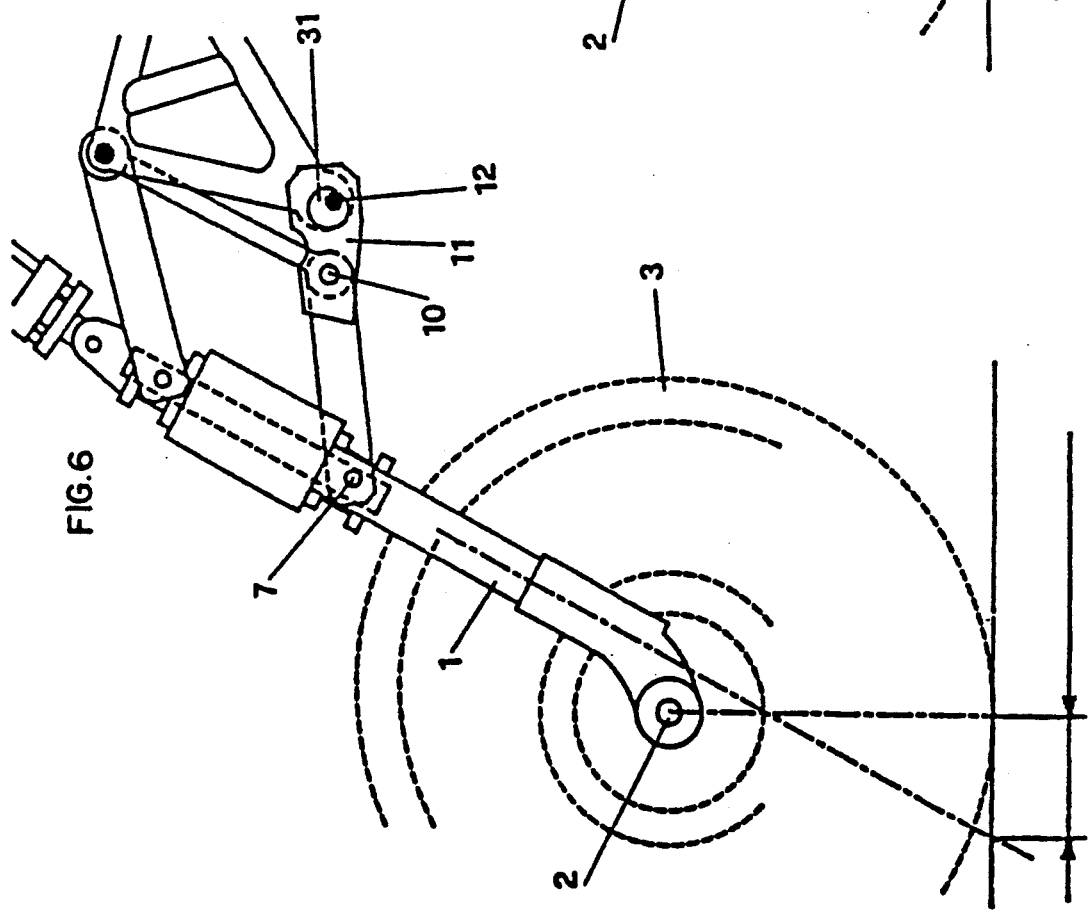

FRONT SHOCK ABSORBING UNIT FOR MOTORCYCLES

BACKGROUND OF THE INVENTION

The present invention concerns a front shock absorbing unit for motorcycles.

At the present time, shock absorption on the front wheel of motorcycles and similar vehicles is effected by means of telescopic forks, the operation of which depends on elastic means assisted by hydraulic or gas devices. Forks of this kind have numerous disadvantages, even when they are of the highest quality, as in the case of those for competition motorcycles.

The disadvantages presented by the shock absorbers of the known type are due basically to the fact that the front wheel assembly tends to become deformed under the effect of the remarkable shearing, bending and torsional stresses it is subjected to, especially at high speed.

SUMMARY OF THE INVENTION

The object of the present invention is to create a shock absorbing unit for the front wheel of motorcycles which is free from the disadvantages previously described.

According to the invention, this may be achieved by providing a deformable structure with an upper and lower fork each including a plurality of arms, pivoted on a first end to a sleeve that is integral with the stanchions which are themselves pivoted to the wheel hub, and, on a second fork end, where the fork arms are at their widest distance apart, the upper fork is pivoted to the frame and the lower fork is pivoted to a pair of link rods which are in turn pivoted to the frame. A plurality of first pins at the ends second of the forks are mutually connected to a cross, and a plurality of second pins connecting to the frame are linked to rods in which one each there is fixed a tube for supporting the handlebar.

Each tube is secured at a first joint by means of a structure which includes a plurality of rods which are secured at a second joint to the upper ends of the stanchions connected to the wheel hub wherein a plate slides on the plurality of rods. In addition, there is a tie rod pivoted on one end to each of the arms of the upper fork, another end of the tie rod being pivoted to a first end of a lever which is centrally pivoted to the frame and is pivoted at its other end to one end of a shock absorbing element. The shock absorbing element is pivoted to the frame at its opposite end and located in such a way as to correspond to a longitudinal plane of symmetry of the frame.

In one embodiment of the invention as claimed below, the connecting pins between the link rods and the frame present an eccentric element which varies the angular position by which the shape of the entire shock absorbing unit is modified, especially the angle of the stanchions with respect to the vertical. This makes it possible to adapt the position of the stanchions themselves to the changed requirements of the rider, in relation to the course which the rider is following.

BRIEF DESCRIPTION OF THE DRAWINGS

These and other characteristics of the present disclosure are highlighted in the following detailed description of its preferred, although not sole, embodiment, with reference to the accompanying drawings, where:

FIGS. 6 and 7 are side views of the shock absorbing device which highlight the possibility of varying the angle of the stanchions relative to the front wheel.

DESCRIPTION OF THE PREFERRED EMBODIMENTS

Figure 1:
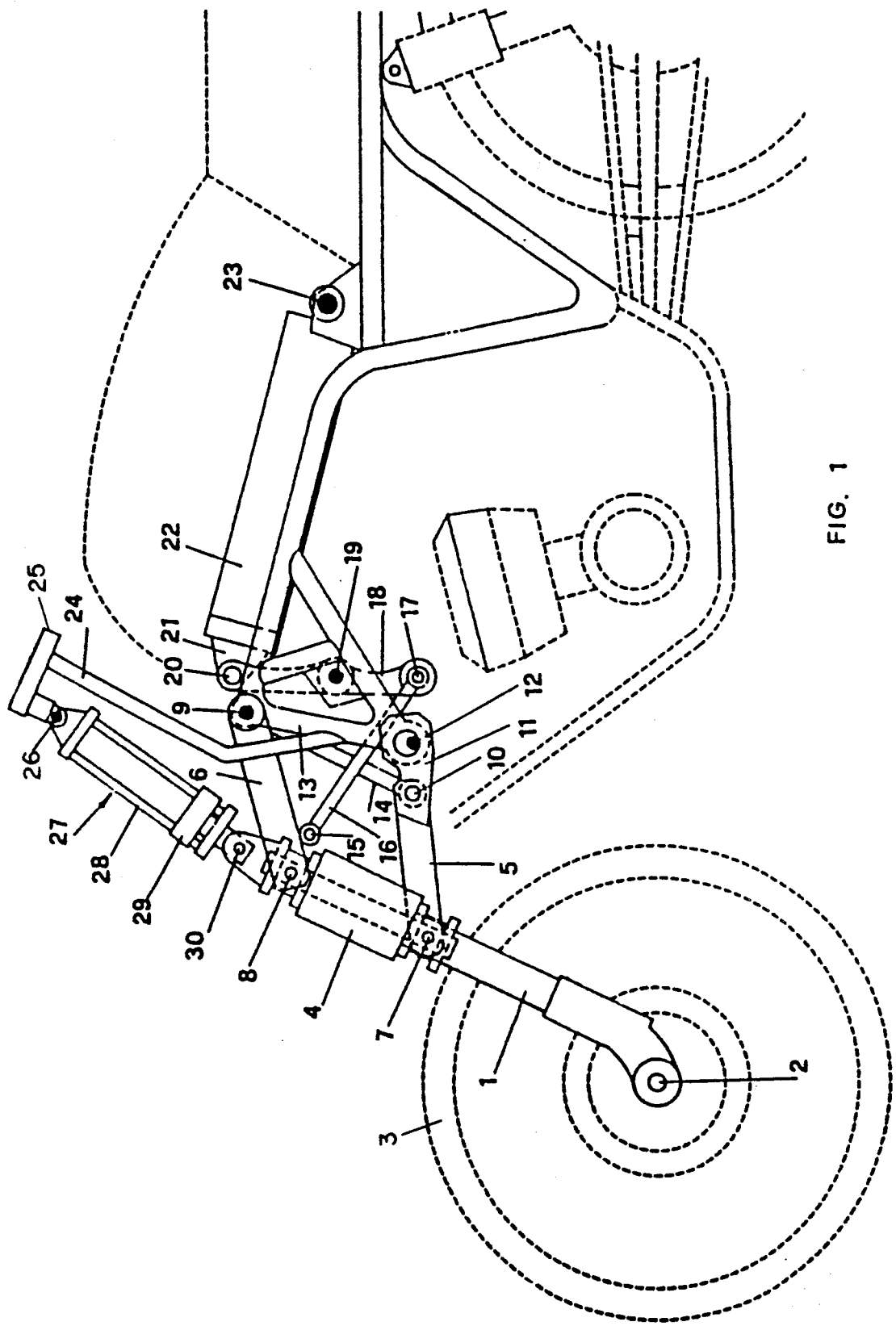
FIG. 1 is a schematic side view of a motorcycle to which the shock absorbing device may be applied.
Figure 2:
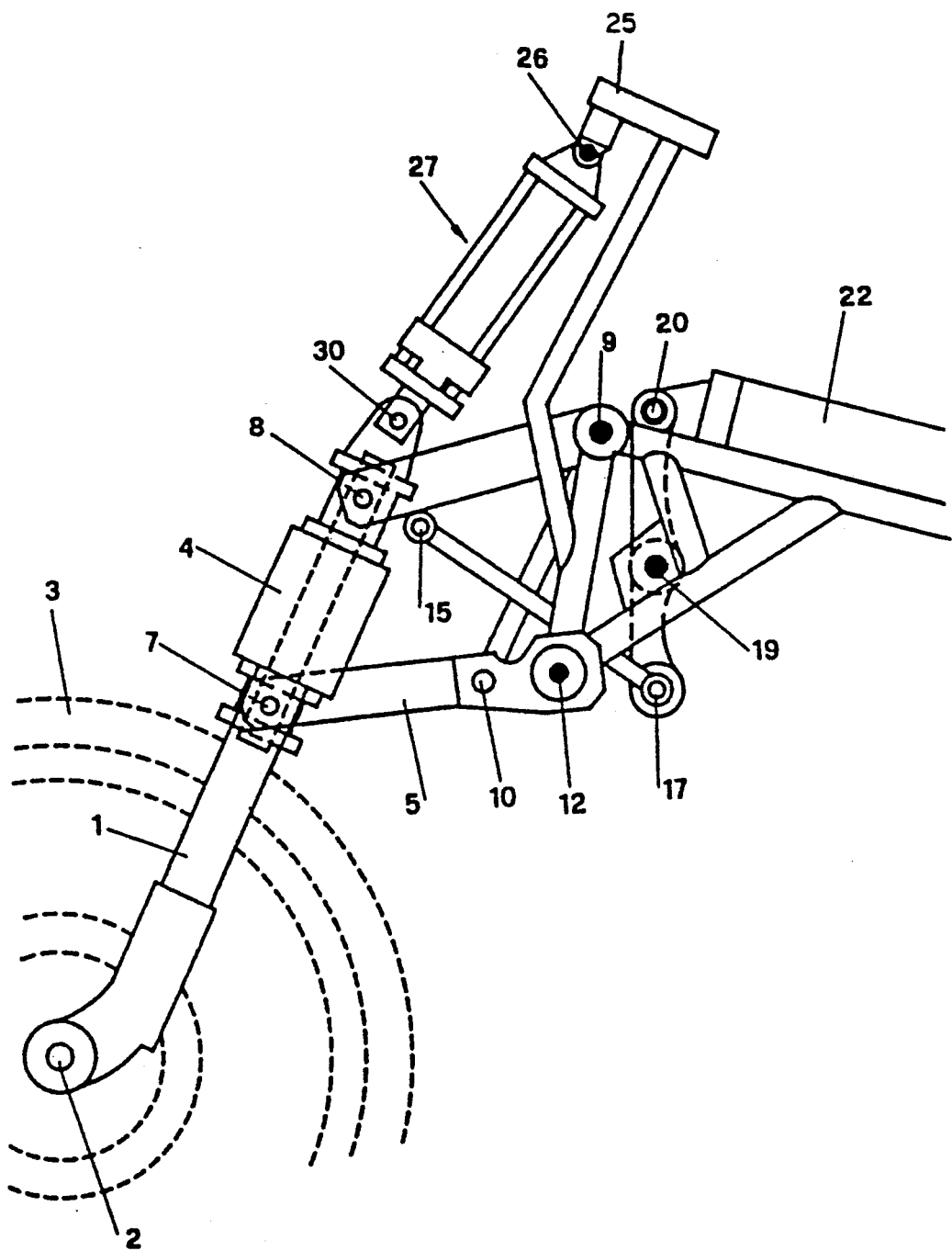
FIG. 2 is a side view of the shock absorbing device.

The illustrations listed above show that the invention includes a pair of rigid stanchions 1, the lower ends of each of which are pivoted to a hub 2 of a front wheel 3, and the upper ends of each of which are integrally attached to a support sleeve 4.

Two forks 5 and 6 are pivoted to the stanchions at points 7 and 8, respectively. The forks are arranged in such a way that the area in which they are furthest apart is towards the rear of the motorcycle.

While the ends of upper fork 6 are pivoted to the motorcycle frame at point 9, the ends of the arms of fork 5 are pivoted to a link rod 11 at point 10, the link rod being in turn pivoted to the fixed frame structure at point 12.

Each pair of pins 9 and 12 which are located on the same side of the motorcycle are linked by a rod 13.

Figures 3, 4:
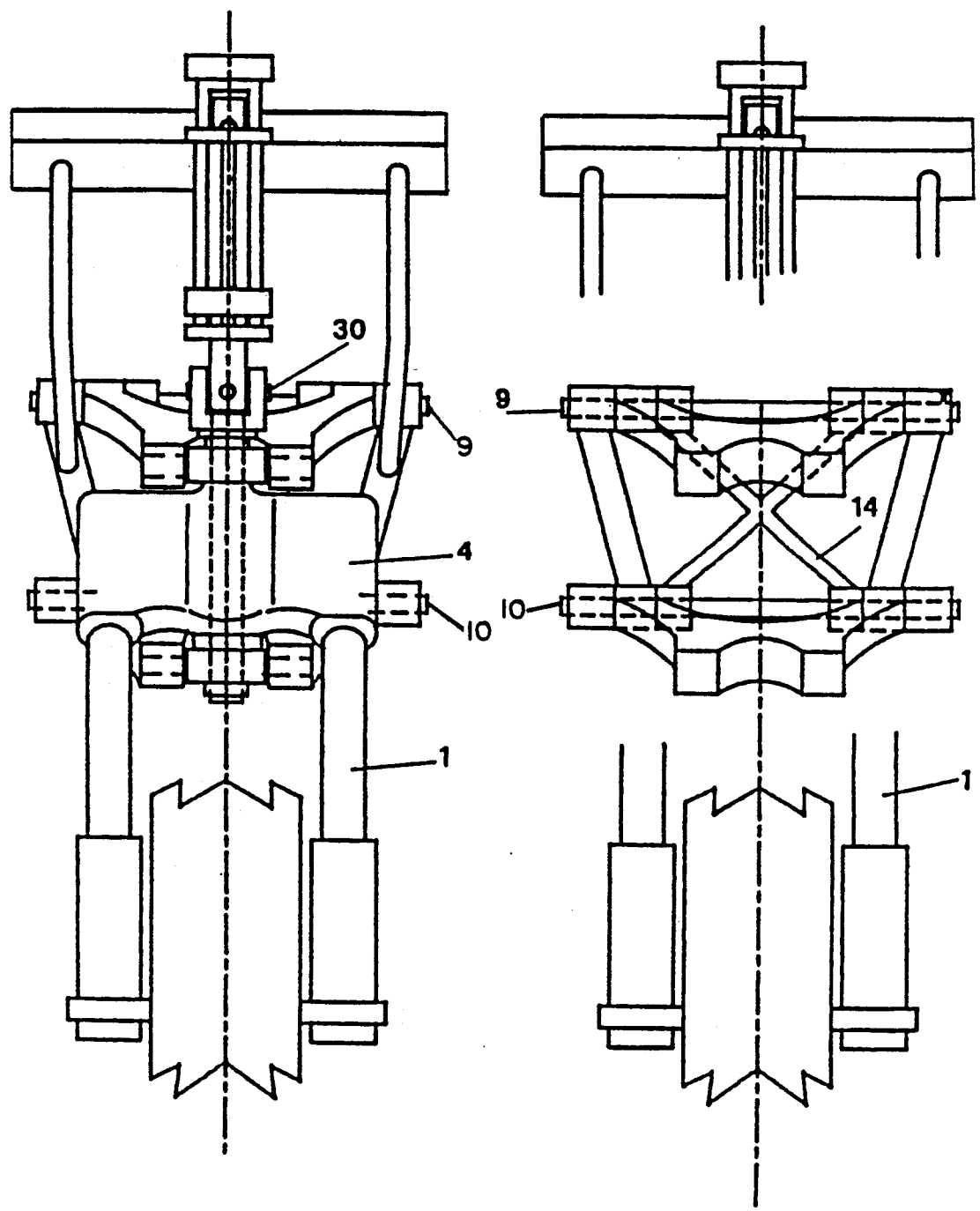
FIGS. 3 and 4 are front elevational views of the device, respectively with and without some of its components.
Figure 5:
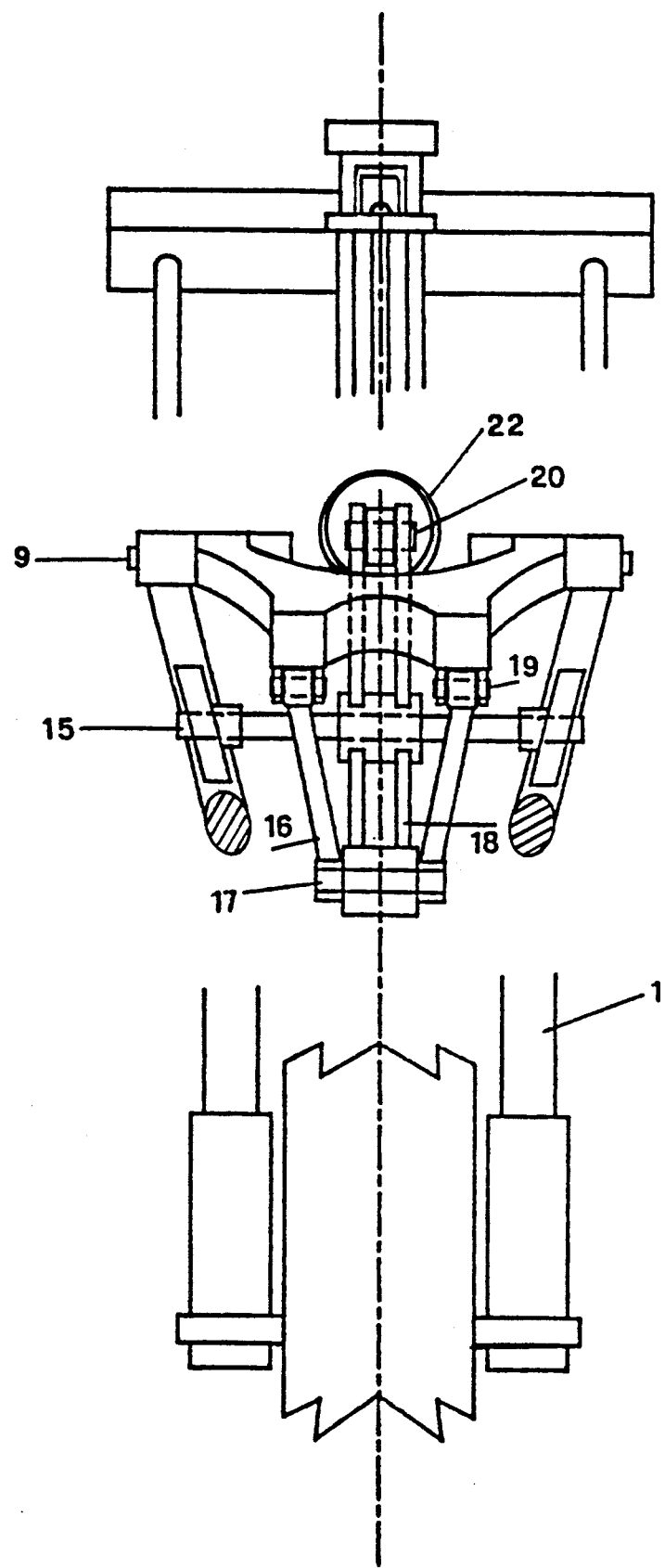
FIG. 5 is a front elevational view of the shock absorbing device, without some of its components.

Pins 9 and 10, on the other hand, are linked to a fixed cross 14 (FIG. 4).

Two tie rods 16 are pivoted at point 19 to the two arms of the upper fork 6, the opposite ends of the tie rods 16 being pivoted at point 17 to an arm 18 of a lever which is in turn pivoted to the frame at point 15.

The opposite ends of the upper fork arms are pivoted at point 20 to head 21 of a shock absorber 22, which is of hydraulic type for example.

The rear end of a the shock absorber is pivoted to the motorcycle frame at point 23 and is located in such a way as to correspond to the plane of symmetry of the frame.

The motorcycle handlebar, which for simplicity is not illustrated, is supported by tubes 24 which are integrally attached to rods 13.

At the upper end of tubes 24 is a supporting element 25, which is attached by means of a universal joint 26 to a structure 27 that includes a plurality of rods 28 on which there slides a plate 29 which is attached by means of another universal joint 30 to the upper end of sleeve 4 which is fixed integrally to stanchions 1 (FIG. 3).

Consequently, when the front wheel 3 encounters a sudden depression in the road, which with the known devices causes the stanchions of the shock absorbers to sink deeply into their cylinders, the articulated framework described above is designed to absorb the shock by yielding to the force which tends to deform it.

In particular, the stanchions 1 and, hence sleeve 4, are designed to move up and to carry pins 7 and 8 with them, in such a manner as to cause forks 5 and 6 to rotate upwards about pins 9 and 12 which connect the shock absorber to the motorcycle frame, pins 9 and 12 obviously remain fixed in relation to the frame.

This results in the shifting of tie rods 16 and hence the rotation of arm 18 about pin 19 (in a clockwise direction, with reference to FIG. 1).

This results in the compression of shock absorber 22 which obviously reacts with a force which tends to move arm 18 back to the position illustrated in the drawing.

The shape of the system is such that this reaction occurs extremely rapidly and effectively, enabling the entire system, after every shock, to return very rapidly to the position illustrated in the drawing.

In practice, the present shock absorber eliminates the defect typical of shock absorbers presently known whereby the stanchions sink deeply into their cylinders whenever the shock absorber is subjected to strain.

In particular, when the motorcycle is braked suddenly, the front wheel stanchions hardly move down at all, thanks to the special structure of this system.

Moreover, the fact that the shock absorber is positioned centrally on the frame prevents all possible strain, be it torsional, flexural or other, on the moving parts, which occurs in known shock absorbers.

Other advantages of the present invention are that the center of gravity of the entire motorcycle is lower than usual. Also, during the operation of the shock absorber, the distance between the wheel centers does not undergo any variation.

FIGS. 6 and 7 show that the device is even more effective if pins 12 are housed eccentrically in a cylindrical structure 31 that is able to rotate about its own axis within a seating made transversely on link rod 11.

Obviously, when this cylindrical structure rotates, the position of pin 12 changes in such a way as to modify the angle of the stanchions with respect to the vertical. In particular, the position shown in FIG. 6 is suitable for straight courses with few curves, while the position shown in FIG. 7 is particularly suitable for tortuous courses.

What is claimed:

1. A front shock absorbing unit for motorcycles comprising a deformable structure with an upper fork and a lower fork, each including a plurality of arms, said forks each being pivoted on a first end to a sleeve which is integrally attached to a pair of stanchions fixed to a hub of a wheel, and, on a second end, where the forks are at their widest distance apart, the upper fork is pivoted on second end by pins to the frame of the motorcycle and the lower fork is pivoted by pins to a pair of link rods which are in turn pivoted by pins to the frame, wherein said pins located at the second end of the forks are mutually connected to a cross, and wherein those pins which are connected to the frame on each side thereof are linked in pairs by a first rod to which there is fixed a tube for supporting a handlebar, said tube being secured at a first joint by means of a structure which includes a plurality of second rods, said structure being secured at a second joint to the upper ends of the stanchions connected to the wheel hub, wherein a plate slides on said plurality of second rods, and further comprising a tie rod pivoted at one end to each of the arms of the upper fork, the other end of said tie rod being pivoted to an end of a lever which is centrally pivoted to the frame and is pivoted at its other end to one end of a shock absorbing element, said shock absorbing element being pivoted at its other end to the frame wherein said shock absorbing element extends along a longitudinal plane of symmetry of the frame.

2. A front shock absorbing unit for motorcycles as in claim 1 wherein the pins with which the link rods are connected to the frame, are housed eccentrically in a cylindrical structure within a seating made transversely on said link rod, said cylindrical structure being capable of effecting angular movements about its own axis.

3. A front shock absorbing unit for motorcycles which comprises:
(a) a pair of stanchions fixed to a hub of a wheel;
(b) a sleeve which is integrally attached to the stanchions;
(c) an upper fork and a lower fork, each including a plurality of fork arms;
(d) a first pivot means for pivoting the forks at a first fork end to the sleeve;
(e) a second pivot means for pivoting the forks at a second fork end, where the fork arms are at their widest distance apart, such that the upper fork is pivoted to a frame and the lower fork is pivoted to a pair of link rods which are in turn pivoted to the frame;
(f) a cross pivotally connecting the forks to each other at the second fork ends;
(g) a first rod pivotally secured on each side of the frame;
(h) a tube secured to each first rod wherein the tube is secured at a second end by a first joint to a structure which includes a plurality of second rods, said structure being secured at a second joint to the upper ends of the stanchions, wherein a plate slides on said rods;
(i) a pair of tie rods each pivoted at a first rod end to the upper fork, a second end of each tie rod being pivoted to a first end of a lever which is centrally pivoted to the frame;
(j) a shock absorbing element which is pivoted, at a first end, to a second end of the lever and pivoted at its second end to the frame, said shock absorbing element extending along a longitudinal plane of symmetry of the frame.

4. An articulated front shock absorbing unit for motorcycles, comprising:
an upper fork having first and second ends;
a lower fork having first and second ends;
a stanchion means for rotatably supporting a wheel;
a sleeve secured to the stanchion means, wherein said upper and lower forks are each pivotally secured at said first ends thereof to said sleeve;
a frame, wherein said second end of said upper fork is pivotally secured to said frame;
a link rod means for pivotally securing said second end of said lower fork to said frame;
a cross securing said first and second forks to each other adjacent said second ends of said first and second forks;
a support means, secured to said frame, for supporting a handlebar;
a structure including a plurality of rods, said structure having a first end and a second end, said structure being secured by a first joint at said first end to said support means and being secured at said second end by a second joint to said stanchion means;
a tie rod secured at a first end to said upper fork;
an arm having a first end to which a second end of said tie rod is pivotally secured, said arm being pivoted to said frame; and,
a shock absorber having a first end to which a second end of said arm is pivotally secured, said shock absorber having a second end which is pivotally secured to said frame, wherein said shock absorber extends along a longitudinal axis of said frame.

5. The shock absorbing unit of claim 4 comprising a plate which is slideably mounted on said plurality of rods of said structure.

6. The shock absorbing unit of claim 4 wherein said first and second joints each comprise universal joints.

7. The shock absorbing unit of claim 4 wherein said support means comprises:
   first and second rods which are spaced from each other and are each pivotally secured to said frame;
   first and second tubes which are spaced from each other and are fixedly secured, respectively, to said first and second rods; and
   a supporting element fixedly secured to said first and second tubes.

8. The shock absorbing unit of claim 4 wherein said lower fork second end includes first and second legs and wherein said link rod means comprises:
   a first link rod pivotally secured at a first end to said lower fork second end first leg and pivotally secured at a second end to said frame; and,
   a second link rod pivotally secured at a first end to said lower fork second end second leg and pivotally secured at a second end to said frame.

* * * * *